(12) United States Patent
Taira et al.

(10) Patent No.: US 9,884,625 B2
(45) Date of Patent: Feb. 6, 2018

(54) VEHICLE TRAVELING CONTROL DEVICE

(71) Applicant: TOYOTA JIDOSHA KABUSHIKI KAISHA, Toyota-shi, Aichi-ken (JP)

(72) Inventors: Tetsuya Taira, Nisshin (JP); Yoshinori Watanabe, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/098,795

(22) Filed: Apr. 14, 2016

(65) Prior Publication Data

US 2016/0304097 A1 Oct. 20, 2016

(30) Foreign Application Priority Data

Apr. 20, 2015 (JP) ................................ 2015-085952

(51) Int. Cl.
*B60W 30/18* (2012.01)
*B60W 10/04* (2006.01)
*B60W 10/20* (2006.01)
*B60W 10/184* (2012.01)

(52) U.S. Cl.
CPC ...... *B60W 30/18163* (2013.01); *B60W 10/04* (2013.01); *B60W 10/184* (2013.01); *B60W 10/20* (2013.01); *B60W 2550/20* (2013.01); *B60W 2550/302* (2013.01); *B60W 2550/306* (2013.01); *B60W 2550/308* (2013.01)

(58) Field of Classification Search
CPC ........... B60W 30/18163; B60W 10/04; B60W 10/184; B60W 10/20; B60W 2550/20; B60W 2550/302; B60W 2550/306; B60W 2550/308
See application file for complete search history.

(56) References Cited

U.S. PATENT DOCUMENTS 8,457,827 B1 6/2013 Ferguson et al.
2005/0096838 A1* 5/2005 Jung .................... G05D 1/0246
701/532
(Continued)

FOREIGN PATENT DOCUMENTS

| JP | 2006-53109 A | 2/2006 |
| JP | 2014-61792 A | 4/2014 |
| WO | 2015/052865 A1 | 4/2015 |

*Primary Examiner* — Krishnan Ramesh
(74) *Attorney, Agent, or Firm* — Sughrue Mion, PLLC

(57) ABSTRACT

A vehicle traveling control device includes an acquisition unit that acquires surrounding information on the vehicle; an external situation determination unit that determines whether there is space, into which the vehicle will enter, in the adjacent lane based on the surrounding information on the vehicle; and a vehicle control unit that causes the vehicle to change the lane along a traveling trajectory predetermined to change the lane from the traveling lane to the adjacent lane. The vehicle control unit is configured to move the vehicle along the traveling trajectory and place the vehicle in a waiting state at a waiting position if the external situation determination unit determines that there is not the space, and is configured to move the vehicle from the waiting position to the space if the external situation determination unit determines that there is the space while the vehicle is placed in the waiting state.

8 Claims, 7 Drawing Sheets

(56) References Cited

U.S. PATENT DOCUMENTS

| | | | | |
|---|---|---|---|---|
| 2009/0088925 A1* | 4/2009 | Sugawara | ............. | B60W 30/12 701/41 |
| 2012/0239253 A1 | 9/2012 | Schmidt et al. | | |
| 2014/0074356 A1* | 3/2014 | Bone | ...................... | G08G 1/167 701/41 |
| 2016/0297447 A1* | 10/2016 | Suzuki | .................. | B60W 30/16 |

* cited by examiner

VEHICLE TRAVELING CONTROL DEVICE

INCORPORATION BY REFERENCE

The disclosure of Japanese Patent Application No. 2015-085952 filed on Apr. 20, 2015 including the specification, drawings and abstract is incorporated herein by reference in its entirety.

BACKGROUND OF THE INVENTION

1. Field of the Invention

The present invention relate to a vehicle traveling control device.

2. Description of Related Art

U.S. Pat. No. 8,457,827 describes the traveling control device of a vehicle. The device described in U.S. Pat. No. 8,457,827 predicts the behavior of the other vehicles around a vehicle based on the current vehicle state and the current surrounding environment. This device performs the autonomous driving of the vehicle based on the predicted behavior of the other vehicles.

When a vehicle is going to change the lane to an adjacent lane but the adjacent lane is crowded, it sometimes happens that the inter-vehicle distance between the vehicles traveling in the adjacent lane is short and there is no space, required for the vehicle to change the lane, between the vehicles traveling in the adjacent lane. In such a case, there is a possibility that the vehicle cannot change the lane autonomously. For example, if the traveling control device of a vehicle predicts, as a result of the prediction of the behavior of the other vehicles travelling in the crowded adjacent lane, that the inter-vehicle distance is shorter than the space required for the vehicle to squeeze between the vehicles, the vehicle must wait before starting changing the lane until the inter-vehicle distance becomes long enough. In this technical field, a vehicle traveling control device that makes it easy to change the lane into a crowded lane has become even more desirable.

SUMMARY OF THE INVENTION

An aspect of the invention relates to a vehicle traveling control device that causes a vehicle traveling in a traveling lane to change the lane to an adjacent lane that is adjacent to the traveling lane and is congested. The vehicle traveling control device includes an acquisition unit, an external situation determination unit and a vehicle control unit. The acquisition unit configured to acquire surrounding information on the vehicle. The external situation determination unit configured to determine whether there is space, into which the vehicle will enter, in the adjacent lane based on the surrounding information on the vehicle. The vehicle control unit configured to cause the vehicle to change the lane along a traveling trajectory predetermined to change the lane from the traveling lane to the adjacent lane. The vehicle control unit is configured to move the vehicle along the traveling trajectory and place the vehicle in a waiting state at a waiting position on a lane boundary between the traveling lane and the adjacent lane or at a waiting position within a predetermined distance from the lane boundary in the traveling lane if the external situation determination unit determines that there is not the space, and the vehicle control unit is configured to move the vehicle from the waiting position to the space if the external situation determination unit determines that there is the space while the vehicle is placed in the waiting state.

According to the aspect described above, the vehicle traveling control device moves the vehicle along the traveling trajectory and places the vehicle in the waiting state at a waiting position on a lane boundary or at a waiting position within a predetermined distance from the lane boundary in the traveling lane if there is not the space, into which the vehicle will enter, in the adjacent lane that is crowded. Therefore, the vehicle traveling control device can request the other vehicles traveling in the adjacent lane or the drivers of the other vehicles to make room for space for lane changing. When space becomes made available in the adjacent lane while the vehicle is placed in the waiting state, the vehicle traveling control device moves the vehicle from the waiting position to the space. In this manner, the vehicle traveling control device can request the other vehicles, which are traveling in the adjacent lane, to make room for space, making it easy to change the lane to the adjacent lane that is crowded.

In the above aspect, the vehicle traveling control device may further include a stop determination unit configured to determine whether a predetermined lane changing stop condition is satisfied based on the surrounding information on the vehicle while the vehicle is placed in the waiting state. The vehicle control unit may be configured to move the vehicle from the waiting position to a predetermined position in the traveling lane if the external situation determination unit does not determine that there is the space while the vehicle is placed in the waiting state and if the stop determination unit determines that the lane changing stop condition is satisfied.

According to the aspect described above, if a request to make room for space for lane changing is issued but the situation continues in which the other vehicles, traveling in the adjacent lane, do not make room for space, the vehicle traveling control device stops the lane changing and moves the vehicle from the waiting position to a predetermined position in the traveling lane. This avoids the condition in which the vehicle will wastefully continue to issue the request to make room for space for lane changing.

In the above aspect, the vehicle traveling control device may further include a stop determination unit configured to determine whether a predetermined lane changing stop condition is satisfied based on the surrounding information on the vehicle while the vehicle is placed in the waiting state. The vehicle control unit may be configured to terminate a traveling control of the vehicle if the external situation determination unit does not determine that there is the space while the vehicle is placed in the waiting state and if the stop determination unit determines that the lane changing stop condition is satisfied. In this case, if a request to make room for space for lane changing is issued but the situation continues in which the other vehicles, traveling in the adjacent lane, do not make room for space, the vehicle traveling control device may switch the driving to the manual driving to allow the driver of the vehicle to determine the subsequent behavior of the vehicle.

In the above aspect, the vehicle traveling control device may further include a stop determination unit configured to determine whether a predetermined lane changing stop condition is satisfied based on the surrounding information on the vehicle while the vehicle is placed in the waiting state; and a warning unit configured to issue a warning to a driver of the vehicle if the external situation determination unit does not determine that there is the space while the vehicle is placed in the waiting state and if the stop determination unit determines that the lane changing stop condition is satisfied. In this case, the vehicle traveling control device can notify the driver of the vehicle that the lane changing should be stopped.

In the above aspect, the stop determination unit may be configured to determine that the lane changing stop condition is satisfied if a predetermined number or more of vehicles traveling in the adjacent lane in parallel have passed the vehicle. In this case, the vehicle traveling control device can stop the lane changing if a request to make room for space for lane changing is issued to a predetermined number or more of other vehicles (traveling in parallel) but no space is made available.

In the above aspect, the stop determination unit may be configured to determine that the lane changing stop condition is satisfied if an inter-vehicle distance between the vehicle and a preceding vehicle is equal to or longer than a first distance and if an inter-vehicle distance between the vehicle and a following vehicle is equal to or shorter than a second distance, the preceding vehicle being a vehicle traveling ahead of the vehicle in the traveling lane, the following vehicle being a vehicle traveling behind the vehicle in the traveling lane. In this case, the vehicle traveling control device can avoid a traffic congestion that might otherwise be caused by requesting to make room for space for lane changing.

According to the aspects and the embodiments of the present invention, the vehicle traveling control device makes it easy for a vehicle to change the lane to a crowded lane.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
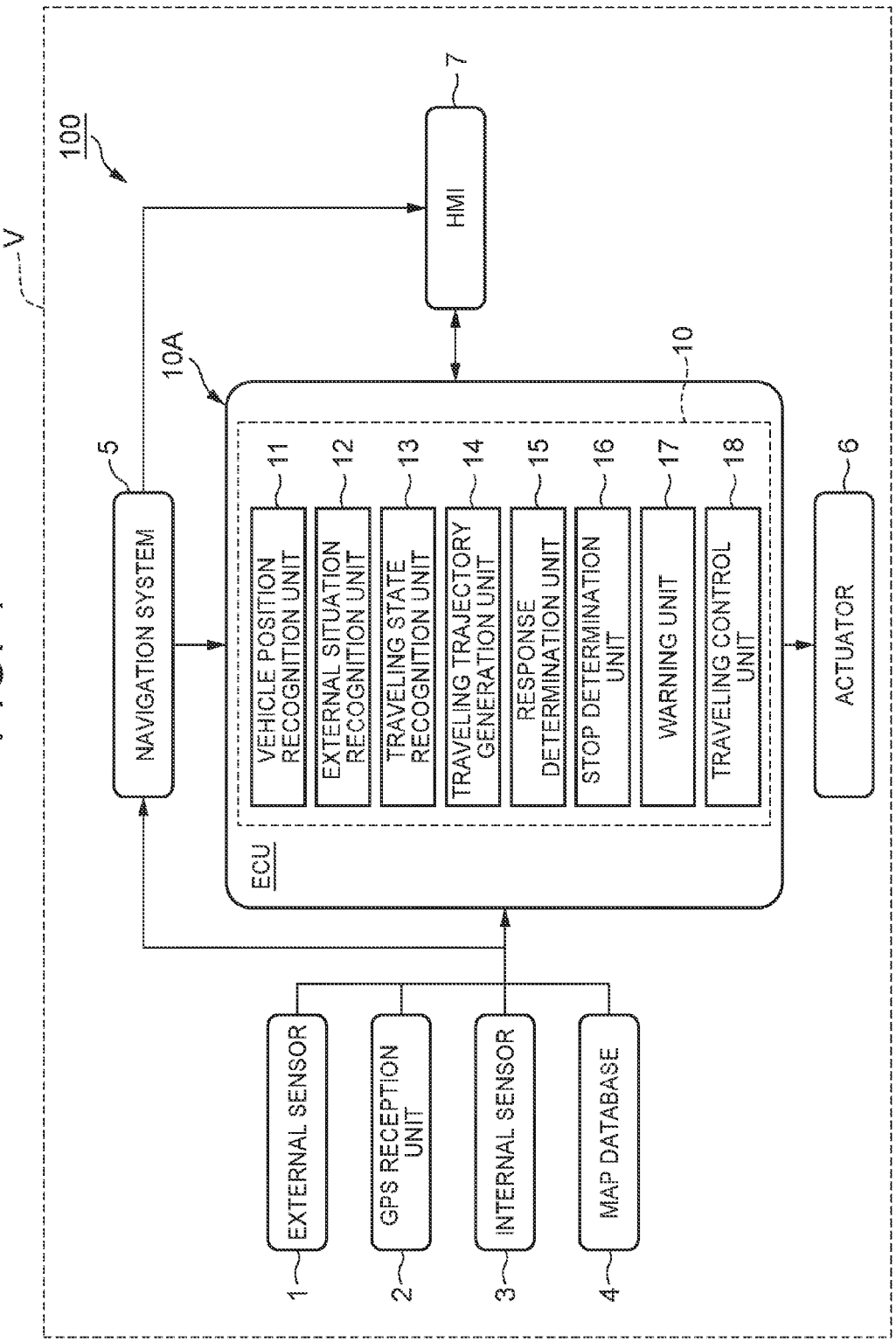
FIG. 1 is a block diagram showing a configuration of a vehicle on which a vehicle traveling control device in an embodiment is mounted.

Embodiments of the present invention are described below with reference to the drawings. In the description below, the same reference numeral is used for the same or equivalent component and the duplicated description is omitted.

FIG. 1 is a block diagram showing a configuration of a vehicle V on which a vehicle traveling control device 10 in an embodiment is mounted. As shown in FIG. 1, a vehicle system 100 is mounted on the vehicle V such as a passenger car. The vehicle system 100, with the vehicle traveling control device 10 included therein, is a system that allows the vehicle V to change the lane autonomously. For example, when a vehicle changes the lane to a crowded lane, the vehicle traveling control device 10 notifies the vehicles, which are traveling in the lane to which the vehicle will change, about an intention to squeeze into the line of vehicles to request them to make room for space required for lane changing. The configuration of the vehicle system 100 is described below.

The vehicle system 100 includes an external sensor 1, a Global Positioning System (GPS) reception unit 2, an internal sensor 3, a map database 4, a navigation system 5, an actuator 6, a Human Machine Interface (HMI) 7, and an ECU 10A.

The external sensor 1 is a detection apparatus for detecting the external situation that is the surrounding information on the vehicle V. The external sensor 1 includes at least one of a camera, a radar, and a Laser Imaging Detection and Ranging (LIDAR).

The camera is a capturing apparatus that captures the external situation of the vehicle V. The camera is provided, for example, on the interior side of the windshield of the vehicle V. The camera may be a monocular camera or a stereo camera. The stereo camera includes two capturing units arranged so that the disparity between the right eye and the left eye can be reproduced. The information captured by the stereo camera also includes the depth direction information. The camera outputs the captured information on the external situation of the vehicle V to the ECU 10A.

The radar detects an object outside the vehicle V using a radio wave. For example, the radio wave is a millimeter wave. The radar detects an object by sending a radio wave to the surroundings of the vehicle V and by receiving the radio wave reflected by an object. The radar can output the distance to, or direction of, an object as the object information. The radar outputs the detected object information to the ECU 10A. When sensor fusion is performed in a subsequent stage, the reception information on the reflected radio wave may be output to the ECU 10A.

The LIDAR detects an object outside the vehicle V using light. The LIDAR measures the distance to a reflection point and detects an object by sending light to the surroundings of the vehicle V and by receiving light reflected by the object. The LIDAR can output the distance to, or the direction of, an object as the object information. The LIDAR sends the detected object information to the ECU 10A. When sensor fusion is performed in a subsequent stage, the reception information on the reflected light may be output to the ECU 10A. Two or more of the camera, LIDAR, and radar need not necessarily be installed.

The GPS reception unit 2 receives signals from three or more GPS satellites to acquire the position information indicating the position of the vehicle V. The position information includes the longitude and the latitude. The GPS reception unit 2 outputs the measured position information on the vehicle V to the ECU 10A. It should be noted that, instead of the GPS reception unit 2, another unit capable of identifying the longitude and latitude of the position of the vehicle V may be used.

The internal sensor 3 is a detection apparatus that detects the information according to the traveling state of the vehicle V. The internal sensor 3 includes at least one of a vehicle speed sensor, an acceleration sensor, and a yaw rate sensor for detecting the information according to the traveling state of the vehicle V.

The vehicle speed sensor is a detection apparatus that detects the speed of the vehicle V. For example, as the vehicle speed sensor, a wheel speed sensor is used. The wheel speed sensor is provided on the wheels of the vehicle V or on a component such as the drive shaft, which rotates in synchronization with the wheels, to detect the rotation speed of the wheels. The vehicle speed sensor outputs the vehicle speed information (wheel speed information), which includes the speed of the vehicle V, to the ECU 10A The acceleration sensor is a detection apparatus that detects the acceleration of the vehicle V. For example, the acceleration sensor includes a longitudinal acceleration sensor that detects acceleration in the longitudinal direction of the vehicle V and a lateral acceleration sensor that detects the lateral acceleration of the vehicle V. The acceleration sensor outputs the acceleration information, which includes the acceleration of vehicle V, to the ECU 10A.

The yaw rate sensor is a detection apparatus that detects the yaw rate (turning angle velocity) around the vertical axis at the center of gravity of the vehicle V. For example, a gyro sensor may be used as the yaw rate sensor. The yaw rate sensor outputs the yaw rate information, which includes the yaw rate of the vehicle V, to the ECU 10A.

The map database 4 is a database that stores map information. For example, the map database 4 is formed in a hard disk drive (HDD) mounted on the vehicle V. The map information includes the position information on roads, the information on road shapes, and the position information on intersections and junctions. The information on a road shape includes the information on whether the road is a curved road or a straight road, the curvature of a curved road, and so on. In addition, when the vehicle system 100 uses the position information on shielding structures, such as a building or a wall, or the Simultaneous Localization and Mapping (SLAM) technology, the map information may include the output signal of the external sensor 1. The map database 4 may also be stored in a computer in facilities, such as an information processing center, that can communicate with the vehicle V.

The navigation system 5 is a device that guides the driver of the vehicle V to the destination that is set on the map by the driver of the vehicle V. The navigation system 5 calculates a route, along which the vehicle V will travel, based on the position information on the vehicle V measured by the GPS reception unit 2 and the map information stored in the map database 4. The route may be a route that identifies a traveling lane, in which the vehicle V will travel, in a multiple-lane area. The navigation system 5 calculates a target route, from the position of the vehicle V to the destination, and informs the driver about the calculated target route through display on the display device or through voice output from the speaker. The navigation system 5 outputs the information on the target route of the vehicle V to the ECU 10A. The navigation system 5 may use information stored in a computer in facilities, such as an information processing center, that can communicate with the vehicle V. For example, the navigation system 5 may acquire traffic congestion information, which indicates the traffic congestion state of the road, from a computer in the facilities via communication. A part of the processing to be performed by the navigation system 5 may also be performed by the computer in the facilities.

The actuator 6 is a device that performs the traveling control of the vehicle V. The actuator 6 includes at least a throttle actuator, a brake actuator, and a steering actuator. The throttle actuator controls the amount of air to be supplied to the engine (throttle angle) according to the control signal from the ECU 10A to control the driving force of the vehicle V. When the vehicle V is a hybrid vehicle or an electric vehicle, the actuator 6 does not include a throttle actuator and, in this case, the control signal is input from the ECU 10A to the motor, which is the source of power, to control the driving force.

The brake actuator controls the brake system according to the control signal, received from the ECU 10A, to control the controlling force to be applied to the wheels of the vehicle V. As the brake system, a hydraulic brake system may be used. The steering actuator controls the driving of the assist motor, one component of the electric power steering system for controlling the steering torque, according to the control signal received from the ECU 10A. By doing so, the steering actuator controls the steering torque of the vehicle V.

The HMI 7 is an interface for outputting and inputting information between the occupants (including the driver) of the vehicle V and the vehicle system 100. The HMI 7 has a display panel for displaying image information to the occupants, a speaker for outputting voices, and operation buttons or a touch panel for allowing the occupants to perform input operations. The HMI 7 includes the autonomous lane-change ON/OFF switch. This switch is an input unit via which an occupant enters a request operation for starting lane changing. The autonomous lane-change ON/OFF switch may also be configured to allow an occupant to enter a request operation for ending an autonomous lane change. In response to a request operation performed by an occupant to start or end an autonomous lane change, the autonomous lane-change ON/OFF switch outputs the information, which indicates the start of an autonomous lane change or the end of an autonomous lane change, to the ECU 10A. The input unit is not limited to a switch but may be any unit that allows an occupant to enter the information indicating the driver's intention to start or end an autonomous lane change. For example, the input unit may be an autonomous lane-change start button or an autonomous lane-change end button, or may be the object of a switch or a button displayed on the screen for operation by the driver. The HMI 7 may output information to the occupants using a wirelessly connected mobile information terminal or may receive an input operation from an occupant using a mobile information terminal.

The ECU 10A controls the vehicle V. The ECU 10A is an electronic control unit that includes a Central Processing Unit (CPU), a Read Only Memory (ROM), a Random Access Memory (RAM), and a Controller Area Network (CAN) communication circuit. The ECU 10A, connected to a network over which communication is carried out using the CAN communication circuit, is connected to the above-described components of the vehicle V so that the ECU 10A can communicate with those components. For example, the ECU 10A causes the CAN communication circuit to operate based on the signal output from the CPU for inputting or outputting data, stores the input data in the RAM, loads a program stored in the ROM into the RAM, and executes the program loaded into the RAM. In this manner, the ECU 10A implements the functions of the components of the ECU 10A that will be described later. The ECU 10A may be configured by a plurality of electronic control units.

The ECU 10A includes a vehicle position recognition unit 11, an external situation recognition unit 12 (an example of an acquisition unit and an external situation determination unit), a traveling state recognition unit 13, a traveling trajectory generation unit 14, a response determination unit 15, a stop determination unit 16 (an example of a stop determination unit), a warning unit 17 (an example of a warning unit), and a traveling control unit 18 (an example of a vehicle control unit). In this embodiment, the vehicle traveling control device 10 is configured by including the vehicle position recognition unit 11, external situation recognition unit 12, traveling state recognition unit 13, traveling trajectory generation unit 14, response determination unit 15, stop determination unit 16, warning unit 17, and traveling control unit 18.

The vehicle traveling control device 10 causes the vehicle V, which is traveling in a traveling lane, to change the lane to a crowded adjacent lane adjacent to the traveling lane. The vehicle traveling control device 10 is only required to include the external situation recognition unit 12, response determination unit 15, and traveling control unit 18 but need not necessarily include the vehicle position recognition unit 11, traveling state recognition unit 13, traveling trajectory generation unit 14, stop determination unit 16, and warning unit 17.

The vehicle position recognition unit 11 recognizes the position of the vehicle V (hereinafter called "vehicle position") on the map based on the position information on the vehicle V received by the GPS reception unit 2 and the map information stored in the map database 4. The vehicle position recognition unit 11 is implemented by causing the CAN communication circuit to operate based on the signal output by the CPU and by loading the program, stored in the ROM, into the RAM and then executing the program loaded into the RAM. The vehicle position recognition unit 11 may also recognize the vehicle position by acquiring the vehicle position, which is used by the navigation system 5, from the navigation system 5. When the vehicle position can be measured by a sensor installed outside the vehicle, for example, on the road, the vehicle position recognition unit 11 may acquire the vehicle position from this sensor via communication.

The external situation recognition unit 12 acquires the surrounding information on the vehicle V. The external situation recognition unit 12 is implemented by causing the CAN communication circuit to operate based on the signal output by the CPU and by loading the program, stored in the ROM, into the RAM and then executing the program loaded into the RAM. The surrounding information refers to the information indicating the environment or situation within a predetermined range from the vehicle V. For example, the external situation recognition unit 12 acquires the detection result of the external sensor 1 as the surrounding information on the vehicle V. The detection result of the external sensor 1 includes the information captured by the camera, the object information detected by the radar, or the object information detected by the LIDAR. As the surrounding information on the vehicle V, the external situation recognition unit 12 may also acquire the traffic congestion information, output by the navigation system 5, via communication.

The external situation recognition unit 12 recognizes the external situation of the vehicle V based on the acquired information. The external situation of the vehicle V may include the information on a branch of the traveling road, a junction point, traffic controls, the positions of the white lines of the traveling lane in which the vehicle V travels or the position of the center of the lane, the road width, and the road shape. The road shape may be the curvature of the traveling lane and a change in the slope of the road surface and the undulations efficiently used for the prospect estimation by the external sensor 1. The external situation of the vehicle V may be the situation of objects such as an obstacle or other vehicles around the vehicle V. The situation of an object may include the information for distinguishing between non-moving obstacles and moving obstacles, the position of an obstacle around the vehicle V, the moving direction of an obstacle around the vehicle V, and the relative speed of an obstacle around the vehicle V. In addition, the external situation of the vehicle V may include the congestion state of the lane in which the vehicle V is traveling and the congestion state of the adjacent lane adjacent to the lane in which the vehicle V is traveling. For example, the external situation recognition unit 12 recognizes that the adjacent lane is congested when the distance between the vehicles traveling in the adjacent lane is equal to or shorter than a predetermined distance (for example, 10 m or shorter). Instead of this, the external situation recognition unit 12 may recognize that the adjacent lane is congested when the average speed or the maximum speed of the vehicles traveling in the adjacent lane is equal to or lower than a predetermined speed (for example, the maximum speed on an expressway is equal to or lower than 20 km/h).

Figure 2:
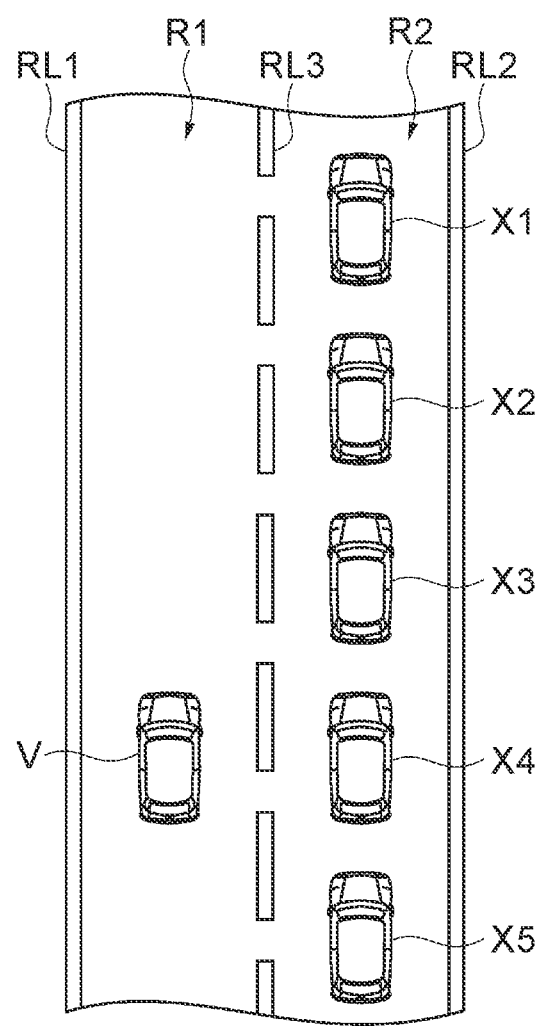
FIG. 2 is a diagram showing an example of a crowded adjacent lane.

FIG. 2 is a diagram showing an example of a crowded adjacent lane. In FIG. 2, the vehicle V is traveling in a traveling lane R1 (the lane between the white line RL1 and the lane boundary RL3) and a plurality of vehicles X1 to X5 is traveling in the adjacent lane R2 (the lane between a white line RL2 and the lane boundary RL3). As described above, the external situation recognition unit 12 recognizes whether the adjacent lane R2 is congested based on the inter-vehicle distance and the speed of the vehicles X1 to X5.

The external situation recognition unit 12 determines whether there is space, into which the vehicle V can enter, in the adjacent lane R2. More specifically, the external situation recognition unit 12 determines whether there is space, into which the vehicle V can enter, in the adjacent lane R2 based on the inter-vehicle distance between any two of the vehicles X1-X5 traveling in the adjacent lane R2. For example, if at least one of the inter-vehicle distances between each two of X1 and X5 is equal to or longer than a predetermine distance, the external situation recognition unit 12 determines that there is space, into which the vehicle V will enter, in the adjacent lane R2. The predetermined distance is set in advance so that, when the vehicle V enters, the drivers of the vehicles before and after the position at which the vehicle V will enter, do not feel uneasy. More specifically, the value calculated by adding the margin a to the longitudinal length of the vehicle V is used as an example of the predetermined distance.

The traveling state recognition unit 13 recognizes the traveling state of the vehicle V based on the detection result of the internal sensor 3. The traveling state recognition unit 13 is implemented by causing the CAN communication circuit to operate based on the signal output by the CPU and by loading the program, stored in the ROM, into the RAM and then executing the program loaded into the RAM. The detection result of the internal sensor 3 includes such information as the vehicle speed information detected by the vehicle speed sensor, acceleration information detected by the acceleration sensor, and yaw rate information detected by the yaw rate sensor. The information indicating the traveling state of the vehicle V includes, for example, the information on the vehicle speed, acceleration, or yaw rate.

The traveling trajectory generation unit 14 generates a traveling trajectory, which indicates the course of the vehicle V, based on the vehicle position recognized by the vehicle position recognition unit 11 and the map information. The traveling trajectory generation unit 14 is implemented by causing the CAN communication circuit to operate based on the signal output by the CPU and by loading the program, stored in the ROM, into the RAM and then executing the program loaded into the RAM. The course is a trajectory along which the vehicle V will travel in a predetermined target route. The traveling trajectory generation unit 14 generates a traveling trajectory before the vehicle control is started. The traveling trajectory in this embodiment includes a traveling trajectory for changing the lane from the traveling lane to the adjacent lane. For example, the traveling trajectory generation unit 14 generates a traveling trajectory according to a geometric method based on the vehicle position and the movement target position in the adjacent lane. For example, the traveling trajectory generation unit 14 generates a traveling trajectory using a compound clothoid curve. Instead of this, the traveling trajectory generation unit 14 may generate a traveling trajectory using not only the vehicle position and the movement target position in the adjacent lane but also the target vehicle speed and the target time. In this case, the traveling trajectory generation unit 14 generates a traveling trajectory via which the vehicle will be able to reach the movement target position within the target time at the target vehicle speed. In addition, the traveling trajectory generation unit 14 may also generate a traveling trajectory to allow the vehicle V to travel while satisfying the criteria of the safety of the vehicle V, regulation compliances, and traveling efficiency. In addition, the traveling trajectory generation unit 14 may generate a traveling trajectory using not only the vehicle position and the map information but also the external situation of the vehicle V (including the vehicle position and direction) recognized by the external situation recognition unit 12. In this case, the traveling trajectory generation unit 14 generates the traveling trajectory of the vehicle V to allow the vehicle to avoid contact with an object based on the situation of the objects around the vehicle V.

For example, the traveling trajectory generation unit 14 generates a traveling trajectory for lane changing when the information indicating the start of autonomous lane changing is acquired from the autonomous lane-change ON/OFF switch and then the driver activates the blinker. In another case, when the vehicle V performs autonomous driving with the autonomous driving system mounted therein, the traveling trajectory generation unit 14 generates a traveling trajectory for lane changing when the external situation recognition unit 12 determines that it is necessary to change the lane. For example, the external situation recognition unit 12 determines that it is necessary to change lane upon recognizing that the number of lanes will be reduced because the traveling road ahead will be divided or branched or the traffic control will be applied.

Figure 3:
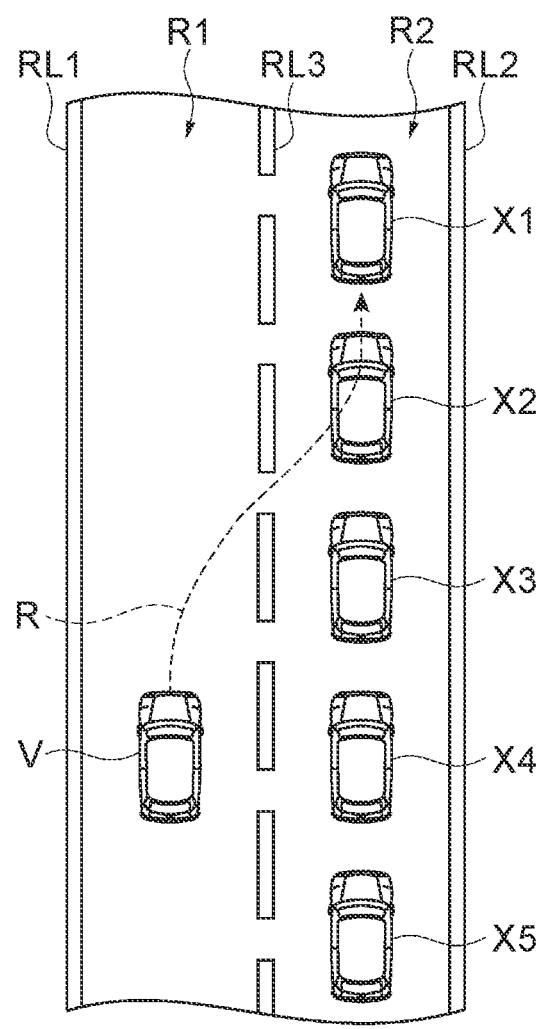
FIG. 3 is a diagram showing an example of a traveling trajectory to a crowded adjacent lane.

FIG. 3 is a diagram showing an example of a traveling trajectory to a crowded adjacent lane. In FIG. 3, the traveling trajectory generation unit 14 generates a traveling trajectory R from the traveling lane R1 to the adjacent lane R2 in the road situation shown in FIG. 2. In this way, the traveling trajectory generation unit 14 generates the traveling trajectory R based on the vehicle position and the movement target position even if the adjacent lane R2 is crowded.

The traveling control unit 18 causes the vehicle V to change the lane along a predetermined traveling trajectory so that the lane is changed from the traveling lane R1 to the adjacent lane R2. The traveling control unit 18 is implemented by causing the CAN communication circuit to operate based on the signal output by the CPU and by loading the program, stored in the ROM, into the RAM and then executing the program loaded into the RAM. The traveling control unit 18 outputs a control signal to the actuator 6 based on the traveling trajectory, generated by the traveling trajectory generation unit 14, to control the t traveling of the vehicle V.

Figure 4A:
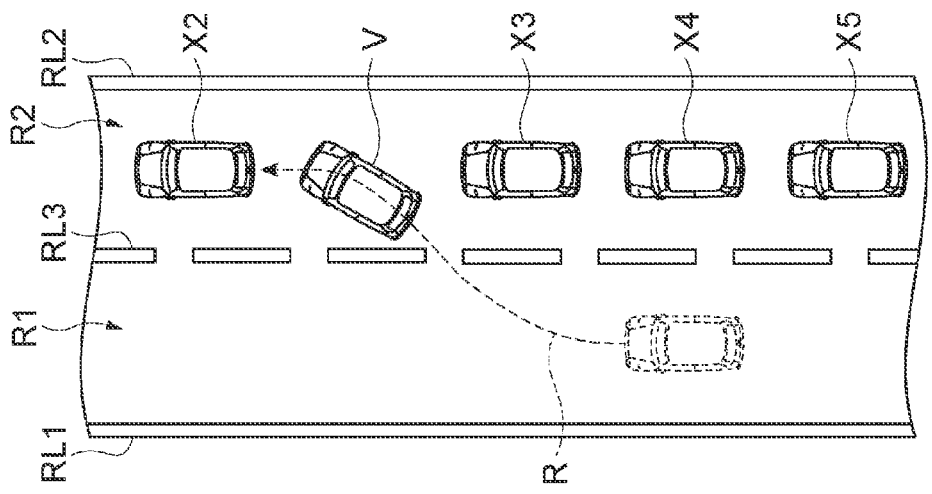
FIG. 4A is a diagram showing an example of lane changing to a crowded adjacent lane.
Figure 4B:
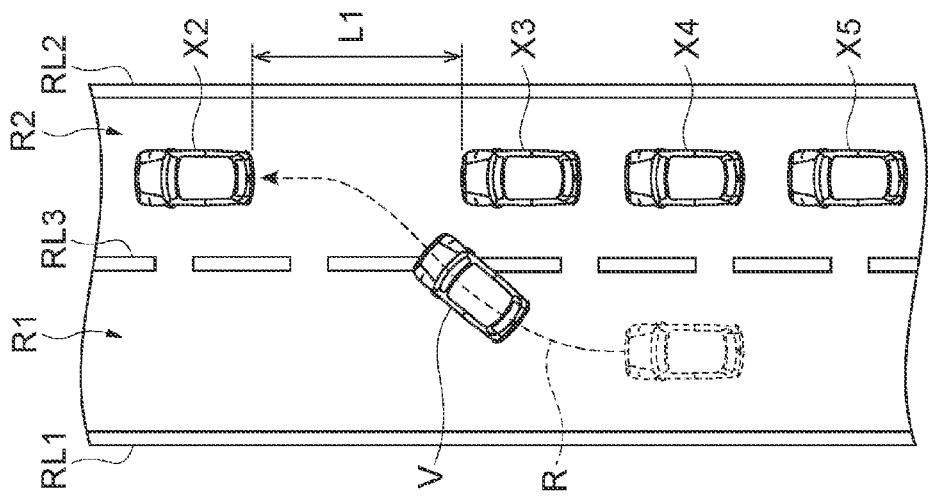
FIG. 4B is a diagram showing an example of lane changing to a crowded adjacent lane.
Figure 4C:
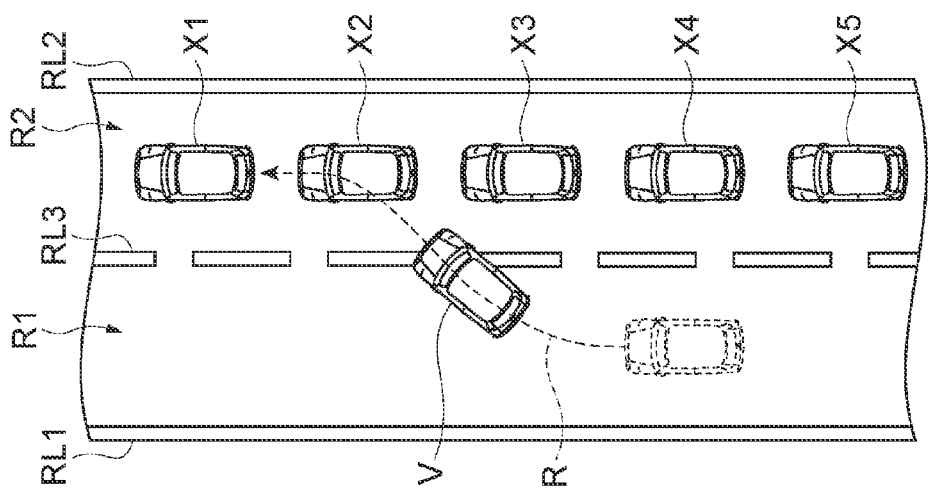
FIG. 4C is a diagram showing an example of lane changing to a crowded adjacent lane.
Figure 5A:
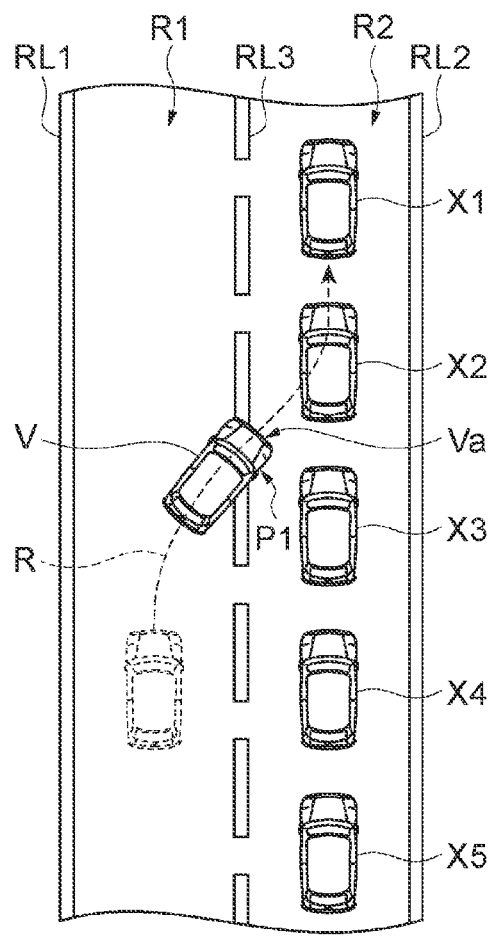
FIG. 5A is a diagram showing an example of a waiting position.
Figure 5B:
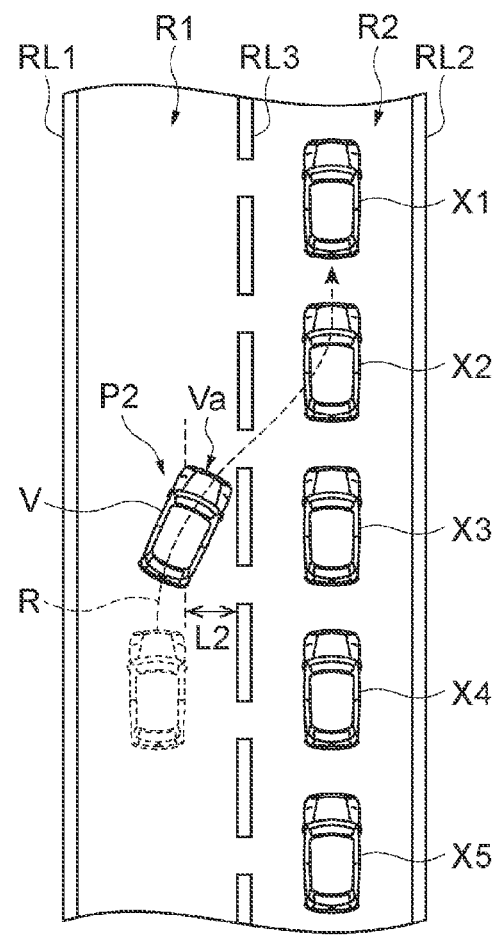
FIG. 5B is a diagram showing an example of a waiting position.

If it is determined by the external situation recognition unit 12 that there is no space in the adjacent lane R2, the traveling control unit 18 notifies the other vehicles or the drivers of the other vehicles about an intention to squeeze into the line of vehicles and requests the other vehicles to make room for space for lane changing. FIGS. 4A-4C are diagrams showing an example of lane changing to a crowded adjacent lane. As shown in FIG. 4A, if it is determined by the external situation recognition unit 12 that there is no space in the adjacent lane R2, the traveling control unit 18 moves the vehicle V along the traveling trajectory R, generated by the traveling trajectory generation unit 14, and places the vehicle V in the waiting state at a predetermined waiting position. The predetermined waiting position refers to a position where lane changing is suspended or delayed. FIGS. 5A and 5B are diagrams showing an example of a waiting position. The waiting position is, for example, on the lane boundary RL3 between the traveling lane R1 and the adjacent lane R2. As shown in FIG. 5A, the waiting position on the lane boundary is the position P1 where the vehicle V overlaps with the lane boundary RL3 when viewed from top. The traveling control unit 18 moves the vehicle V to the position P1 and places the vehicle V in the waiting state by controlling the vehicle V so that the leading edge Va of the vehicle V is a predetermined distance from the lane boundary RL3. Instead of this, the waiting position may be within a predetermined distance from the lane boundary RL3 in the traveling lane R1. As shown in FIG. 5B, the waiting position within a predetermined distance from the lane boundary RL3 in the traveling lane R1 is the position P2 where the leading edge Va of the vehicle V is within the predetermined distance L2 from the lane boundary RL3 when viewed from top. The traveling control unit 18 moves the vehicle V to the position P2 and places the vehicle V in the waiting state by controlling the vehicle V so that the leading edge Va of the vehicle V is within the predetermined distance L2 from the lane boundary RL3. By moving the vehicle V to the waiting position and placing the vehicle V in the waiting state, the traveling control unit 18 can request the vehicles X1 to X5, which are traveling in the adjacent lane R2, to make room for space. The traveling control unit 18 may adjust the waiting position based on the size of the vehicle V, sizes of the other vehicles, position relative to the other vehicles, and the lane width. The traveling control unit 18 may also adjust the waiting position considering the minimum radius gyration of the vehicle V.

The traveling control unit 18 stops the vehicle V at the waiting position and places the vehicle V in the waiting state there. The term "stop" used here refers not only to a complete stop but also to a very slow speed (for example, 0.1 km/h or lower). In any case, if it is determined by the external situation recognition unit 12 that there is no space in the adjacent lane R2, the traveling control unit 18 starts the lane change operation. To do so, the traveling control unit 18 moves the vehicle V to the waiting position and places the vehicle V in the waiting state there to request the vehicles X1 to X5, traveling in the adjacent lane R2, to make room for space. That is, the traveling control unit 18 changes the speed of the vehicle V in a predetermined manner at the waiting position to suspend or delay lane changing and requests the vehicles X1 to X5 to make room for space.

The traveling control unit 18 may start lane changing when a vehicle, which is traveling ahead of the vehicle V in the adjacent lane R2 (for example, the vehicle X2 in FIG. 4A), moves forward about one-half of the space L1 required for lane changing. Starting lane changing in this manner prevents the drivers of the vehicles, which are traveling in the adjacent lane R2 (for example, the vehicle X2 and the vehicle X3 in FIG. 4A), from feeling uneasy.

If it is determined by the external situation recognition unit 12 that the space becomes available while the vehicle V is placed in the waiting state, the traveling control unit 18 moves the vehicle V from the waiting position to the space. For example, assume that the vehicle X2 moves forward but the vehicle X3 continues to be stationary in response to the request, issued from the vehicle V, as shown in FIG. 4B. After that, if it is determined by the external situation recognition unit 12 that there is the space L1 required for lane changing, the traveling control unit 18 determines that a response to the request is received from the vehicle X3. If a response to the request is received from the vehicle X3, the traveling control unit 18 moves the vehicle V from the waiting position to the space as shown in FIG. 4C. This completes lane changing to the adjacent lane R2 that is crowded. FIG. 4C shows an example in which the traveling control unit 18 moves the vehicle V along the traveling trajectory R. Instead, the traveling trajectory generation unit 14 may generate a new traveling trajectory while the traveling control unit 18 moves the vehicle V from the waiting position to the space to allow the traveling control unit 18 to move the vehicle V along the newly generated traveling trajectory.

A response is received from the other vehicles not only when the space L1 is made available. That is, the traveling control unit 18 may also recognize that a response to the request is received from the vehicle X3, using the determination result of the response determination unit 15, as described below.

For example, after the traveling control unit 18 controls the vehicle and requests the other vehicles or the drivers of the other vehicles to make room for space, the response determination unit 15 determines the validity of a response from the other vehicles or the drivers of the other vehicles based on the detection result of the external sensor 1. The response determination unit 15 is implemented by causing the CAN communication circuit to operate based on the signal output by the CPU and by loading the program, stored in the ROM, into the RAM and then executing the program loaded into the RAM. For example, the response determination unit 15 determines that the determination that a response is received is valid if any of the following situations occurs: the length of the space L1 is not decreasing over time at a rate equal to or larger than a predetermined value, the vehicle X3 is stationary or is decelerating, a predetermined signal such as sounds a horn or blinks a light is received from the vehicle X3, a hand signal is received from the driver of the vehicle X3, and the driver's face of the vehicle X3 is directed toward the vehicle V. In this case, the traveling control unit 18 recognizes that a response to the request is received from the vehicle X3 if the space L1 is made available and if the response determination unit 15 determines that the determination that a response is received is valid.

If it is not determined by the external situation recognition unit 12 that the space L1, required for lane changing, is available while the vehicle V is placed in the waiting state and if it is determined that a predetermined lane changing stop condition is satisfied, the traveling control unit 18 performs the lane changing stop processing.

The predetermined lane changing stop condition is determined by the stop determination unit 16. The stop determination unit 16 determines whether the pre-defined lane changing stop condition is satisfied, based on the recognition result (surrounding information) recognized by the external situation recognition unit 12, while the vehicle V is placed in the waiting state. The stop determination unit 16 is implemented by causing the CAN communication circuit to operate based on the signal output by the CPU and by loading the program, stored in the ROM, into the RAM and then executing the program loaded into the RAM. The pre-defined lane changing stop condition, a condition for determining whether to stop lane changing, is determined in advance. For example, one lane changing stop condition is determined to be satisfied if a predetermined number or more of vehicles traveling in parallel in the adjacent lane have passed the vehicle V while the vehicle V is placed in the waiting state. Another lane changing stop condition is determined to be satisfied if the waiting time of the vehicle V (the time counted from the time the vehicle V reaches the waiting position) becomes equal to or longer than a predetermined time while the vehicle V is placed in the waiting state. A still another lane changing stop condition is determined to be satisfied if the traveling distance of the vehicle V (traveling distance from the lane changing position) becomes equal to or longer than the predetermined distance while the vehicle V is placed in the waiting state.

Instead of the determination described above, the stop determination unit 16 may determine that the lane changing stop condition is satisfied if the inter-vehicle distance between the vehicle V and the preceding vehicle, which is traveling ahead of the vehicle V in the traveling lane R1, is equal to or longer than a first distance and if the inter-vehicle distance between the vehicle V and the following vehicle, which is traveling behind the vehicle V in the traveling lane R1, is equal to or shorter than a second distance. The first distance, a threshold for determining the inter-vehicle distance between the vehicle V and the preceding vehicle, is a value determined in advance. The second distance, a threshold for determining the inter-vehicle distance between the vehicle V and the following vehicle, is a value determined in advance. The use of the first distance and the second distance allows the stop determination unit 16 to determine whether there is space ahead of the vehicle V, but not behind the vehicle V, thus avoiding the blocking of the traffic flow. The stop determination unit 16 may determine that the lane changing stop condition is satisfied not only by the first distance and the second distance but also by the detection of a predetermined signal from behind the vehicle V (horn or light). In this case, too, the blocking of the traffic flow can be avoided.

The above-described thresholds used for the lane changing stop condition may be changed according the degree of requirement for lane changing. For example, when the traffic is controlled and, as a result, the traveling lane of the vehicle V will be merged into the adjacent lane ahead of the vehicle V, the threshold may be dynamically changed so that the shorter the distance to the merging point is, the more difficult it is to satisfy the lane changing stop condition. A threshold that is determined according to the degree of requirement for lane changing may be stored in advance in the ROM of the ECU 10A.

Figure 6:
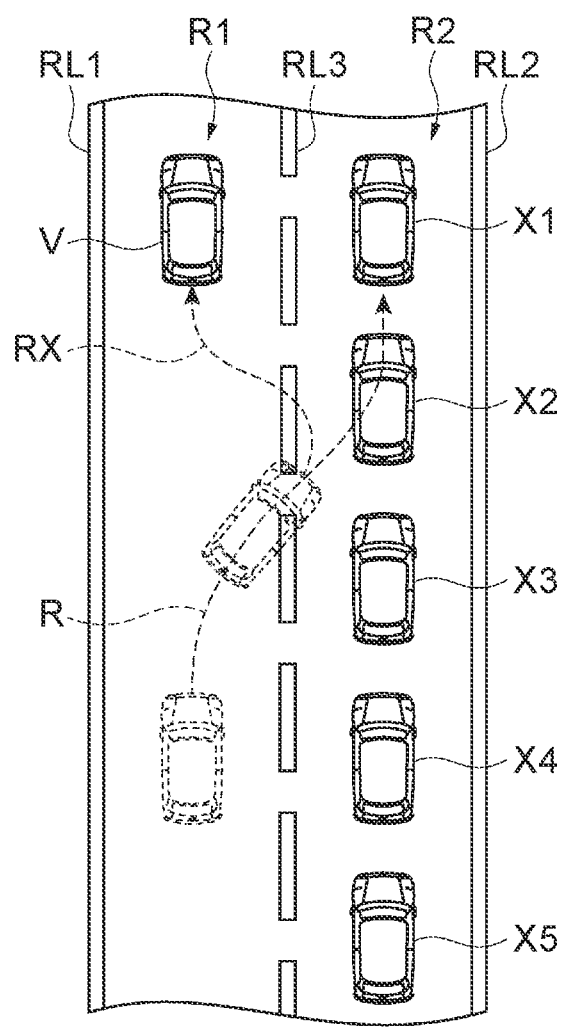
FIG. 6 is a diagram showing an example of the lane changing stop processing.

As the lane changing stop processing, the traveling control unit 18 moves the vehicle V from the waiting position to a predetermined position in the traveling lane R1. One example of the predetermined position is the center of the traveling lane R1 but the predetermined position is not limited to that position. FIG. 6 is a diagram showing an example of the lane changing stop processing. As shown in FIG. 6, if the lane changing stop condition is satisfied, the traveling trajectory generation unit 14 generates a traveling trajectory RX from the waiting position to a predetermined position in the traveling lane R1 and the traveling control unit 18 moves the vehicle V along the traveling trajectory RX. Instead of this, as the lane changing stop processing, the traveling control unit 18 may terminate the autonomous control of the vehicle V and switch the driving to the manual driving. The lane changing stop processing may be performed, not by the traveling control unit 18, but by the warning unit 17.

If it is determined by the external situation recognition unit 12 that there is no space L1, required for lane changing, while the vehicle V is placed in the waiting state and if it is determined by the stop determination unit 16 that the lane changing stop condition is satisfied, the warning unit 17 issues a warning to the driver of the vehicle V. The warning unit 17 is implemented by causing the CAN communication circuit to operate based on the signal output by the CPU and by loading the program, stored in the ROM, into the RAM and then executing the program loaded into the RAM. The warning unit 17 causes the HMI 7 to output a display or a voice guidance indicating that the autonomous lane changing is stopped. This display or voice guidance allows the driver of the vehicle V to know that lane changing should be stopped.

Figure 7:
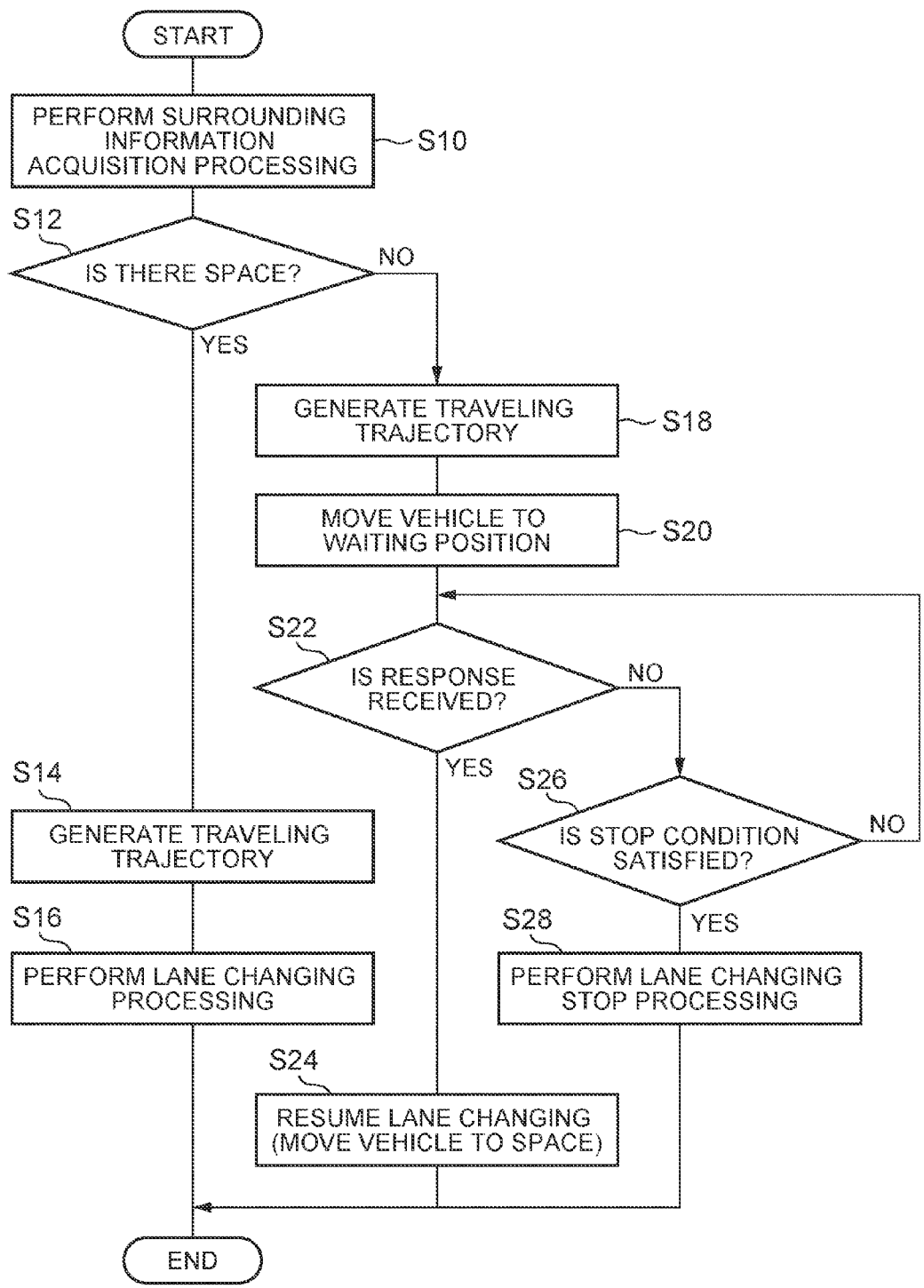
FIG. 7 is a flowchart showing an example of the operation of the vehicle traveling control device in this embodiment.

Next, the processing performed by the vehicle traveling control device 10 is described. FIG. 7 is a flowchart showing an example of the operation of the vehicle traveling control device 10 in this embodiment. The control processing shown in FIG. 7 is performed, for example, when a request operation to start autonomous lane changing is entered via the autonomous lane-change ON/OFF switch. In the description below, it is assumed as a premise that the adjacent lane R2 is congested.

As shown in FIG. 7, the vehicle traveling control device 10 performs the surrounding information acquisition processing (S10) to acquire the surrounding information on the vehicle V. First, the vehicle position recognition unit 11 recognizes the vehicle position based on the position information on the vehicle V received by the GPS reception unit 2 and the map information stored in the map database 4. The external situation recognition unit 12 recognizes the external situation of the vehicle V based on the result detected by the external sensor 1 and the information provided by the navigation system 5. In this case, the traveling state recognition unit 13 may recognize the traveling state of the vehicle V based on the result detected by the internal sensor 3.

Next, the external situation recognition unit 12 performs the space availability determination processing (S12) to determine whether there is the space L1 in the adjacent lane R2. If it is determined that there is the space L1 in the adjacent lane R2, the normal lane-changing processing is performed. That is, the traveling trajectory generation unit 14 generates a traveling trajectory from the vehicle position to the space L1 (S14), and the traveling control unit 18 changes the lane of the vehicle V (S16) based on the traveling trajectory generated in the processing in S14. After that, the processing of the flowchart shown in FIG. 7 is terminated.

On the other hand, if it is determined by the processing in S12 that there is not the space L1 in the adjacent lane R2, the processing proceeds to the traveling trajectory generation processing (S18). As the traveling trajectory generation processing (S18), the traveling trajectory generation unit 14 generates a traveling trajectory R from the traveling lane R1 to the adjacent lane R2. As a result, the traveling trajectory R shown in FIG. 3 is generated.

After that, the traveling control unit 18 determines the waiting position based on the traveling trajectory R generated by the processing in S18 and moves the vehicle V from the vehicle position to the waiting position (S20). This processing causes the vehicle V to move to the waiting position and to enter the waiting state at the waiting position as shown in FIG. 4A. That is, the traveling control unit 18 requests the vehicles in the adjacent lane R2 to make room for space.

Next, the external situation recognition unit 12 determines whether a response to the request, issued from the vehicle V, is received (S22). If it is determined that there is the space L1, required for lane changing, in the adjacent lane R2, the external situation recognition unit 12 recognizes that a response to the request is received. Instead of this, the traveling control unit 18 may also recognize that a response to the request is received, using the determination result of the response determination unit 15. If a response to the request is received, the traveling control unit 18 resumes the lane changing and moves the vehicle V from the waiting position to the space L1 (S24). This completes the lane changing of the vehicle V as shown in FIG. 4C. After that, the processing in the flowchart shown in FIG. 7 is terminated.

On the other hand, if it is determined in the processing in S22 that a response to the request, issued from the vehicle V, is not received, the stop determination unit 16 determines whether the lane changing stop condition is satisfied (S26). If it is not determined in the processing in S26 that the lane changing stop condition is satisfied, the processing proceeds to the processing in S22. In this manner, the processing for determining whether a response to the request, issued from the vehicle V, is received is repeated until the lane changing change stop condition is satisfied.

On the other hand, if it is determined in the processing in S26 that the lane changing stop condition is satisfied, the traveling control unit 18 performs the lane changing stop processing (S26). For example, the traveling control unit 18 moves the vehicle V back to the traveling lane R1 as shown in FIG. 6. Instead of this, the warning unit 17 may perform the lane changing stop processing (S26). For example, the warning unit 17 displays a message on the display of the HMI 7 to notify that lane changing is stopped. After the lane changing stop processing is terminated, the processing in the flowchart shown in FIG. 7 is terminated.

After the above processing is performed, the operation of the vehicle traveling control device 10, shown in FIG. 7, is terminated. When changing the lane to a crowded adjacent lane, the vehicle traveling control device 10 can perform the processing of the flowchart shown in FIG. 7 to notify the vehicles in the adjacent lane about an intention to squeeze into the line of vehicles and to request the vehicles to make room for space required for lane changing.

As described above, the vehicle traveling control device 10 in this embodiment places the vehicle V in the waiting state and requests the vehicles X1 to X5, which are traveling in the adjacent lane R2, or the drivers of the vehicles X1 to X5 to make space for lane changing. After that, when the space L1 is made available in the congested adjacent lane R2 while the vehicle V is placed in the waiting state, the vehicle traveling control device 10 moves the vehicle V from the waiting position to the space L1. In this manner, the vehicle traveling control device 10 requests the vehicles X1 to X5, which are traveling in the adjacent lane R2, to make room for space, making it easier to change the lane to the adjacent lane R2 that is congested.

In addition, if a request to make room for space for lane changing is issued but the situation continues in which the vehicles X1 to X5, traveling in the adjacent lane R2, do not make room for space, the vehicle traveling control device 10 in this embodiment stops the lane changing and moves the vehicle V from the waiting position to a predetermined position in the traveling lane R1. This avoids the condition in which the vehicle V will wastefully continue to issue the request to make room for space for lane changing.

An alternative method is that, if a request to make room for space for lane changing is issued but the situation continues in which the vehicles X1 to X5, traveling in the adjacent lane R2, do not make room for space, the vehicle traveling control device 10 in this embodiment may switch the driving to the manual driving to allow the driver of the vehicle to determine the subsequent behavior of the vehicle.

Another alternative method is that, if a request to make room for space for lane changing is issued but the situation continues in which the vehicles X1 to X5, traveling in the adjacent lane R2, do not make room for space, the vehicle traveling control device 10 in this embodiment issues a warning to notify the driver of the vehicle V that the lane changing should be stopped.

In addition, the vehicle traveling control device 10 in this embodiment can stop lane changing if a request to make room for space for lane changing is issued to a predetermined number or more of other vehicles (traveling in parallel) but no space is made available. The vehicle traveling control device 10 in this embodiment also stops lane changing based on the traffic condition of the traveling lane R1, avoiding a traffic congestion that might otherwise be caused by requesting to make room for space for lane changing.

While the embodiments of the present invention have been described, it is to be understood that the present invention is not limited to the embodiments above. The present invention may be implemented in various modes in which various changes and modifications are added to the embodiments described above based on the knowledge of those skilled in the art.

For example, though the above embodiments describe an example in which the congestion state of the adjacent lane is recognized based on the information acquired by the external sensor 1 or the navigation system 5, the congestion state of the adjacent lane may also be recognized by acquiring the information on the inter-vehicle distance between the vehicles traveling in the adjacent lane using vehicle-vehicle communication or road-vehicle communication.

In addition, the above embodiment describes an example in which the traveling trajectory R from the traveling lane to the adjacent lane is generated based on the vehicle position and the movement target position, the generation method of the traveling trajectory R is not limited to the method described above. For example, the traveling trajectory generation unit 14 may generate the traveling trajectory R, along which the vehicle will change the lane to the adjacent lane that is crowded, based on the vehicle position and on the positions of the vehicles traveling in the adjacent lane acquired by the external situation recognition unit 12. In this case, the traveling trajectory generation unit 14 generates the traveling trajectory R that allows the vehicle V to squeeze in front of a vehicle that will be the following vehicle of the vehicle V after the lane changing. For example, the traveling trajectory generation unit 14 sets one of the vehicles, which are traveling in the adjacent lane, as a target vehicle and generates the traveling trajectory R along which the vehicle V will squeeze in front of the target vehicle. Even when such a traveling trajectory R is generated, the vehicle traveling control device 10 can request the vehicles, which are traveling in the adjacent lane R2, to make room for space, making it easy to change the lane to the adjacent lane that is crowded.

What is claimed is:

1. A vehicle traveling control device that causes a vehicle traveling in a traveling lane to change the lane to an adjacent lane that is adjacent to the traveling lane and is congested, comprising:
an electronic control unit programmed to:
acquire surrounding information on the vehicle;
determine whether there is space, into which the vehicle will enter, in the adjacent lane based on the surrounding information on the vehicle;
based upon a determination that there is space for the vehicle to enter in the adjacent lane, generate a traveling trajectory from the traveling lane to the space and cause the vehicle to change the lane along the traveling trajectory from the traveling lane to the space;
based upon a determination that there is no space for the vehicle to enter in the adjacent lane, generate a traveling trajectory from the traveling lane to the adjacent lane and move the vehicle along the traveling trajectory and place the vehicle in a waiting state at a waiting position on a lane boundary between the traveling lane and the adjacent lane or at a waiting position within a predetermined distance from the lane boundary in the traveling lane, and
move the vehicle from the waiting position to the space if the electronic control unit determines that there is the space while the vehicle is placed in the waiting state.

2. The vehicle traveling control device according to claim 1, wherein the electronic control unit is further programmed to determine whether a predetermined lane changing stop condition is satisfied based on the surrounding information on the vehicle while the vehicle is placed in the waiting state, and
move the vehicle from the waiting position to a predetermined position in the traveling lane if the electronic control unit does not determine that there is the space while the vehicle is placed in the waiting state and determines that the lane changing stop condition is satisfied.

3. The vehicle traveling control device according to claim 2, wherein the electronic control unit is further programmed to determine that the lane changing stop condition is satisfied if a predetermined number or more of vehicles traveling in the adjacent lane in parallel have passed the vehicle.

4. The vehicle traveling control device according to claim 2, wherein the electronic control unit is further programmed to determine that the lane changing stop condition is satisfied if an inter-vehicle distance between the vehicle and a preceding vehicle is equal to or longer than a first distance and if an inter-vehicle distance between the vehicle and a following vehicle is equal to or shorter than a second distance, the preceding vehicle being a vehicle traveling ahead of the vehicle in the traveling lane, the following vehicle being a vehicle traveling behind the vehicle in the traveling lane.

5. The vehicle traveling control device according to claim 1, wherein the electronic control unit is further programmed to determine whether a predetermined lane changing stop condition is satisfied based on the surrounding information on the vehicle while the vehicle is placed in the waiting state, and terminate a traveling control of the vehicle if the electronic control unit does not determine that there is the space while the vehicle is placed in the waiting state and determines that the lane changing stop condition is satisfied.

6. The vehicle traveling control device according to claim 1, wherein the electronic control unit is further programmed to:

determine whether a predetermined lane changing stop condition is satisfied based on the surrounding information on the vehicle while the vehicle is placed in the waiting state; and issue a warning to a driver of the vehicle if the electronic control unit does not determine that there is the space while the vehicle is placed in the waiting state and determines that the lane changing stop condition is satisfied.

7. The vehicle traveling control device according to claim 1, wherein the electronic control unit is further programmed to determine validity of a reception of a response from another vehicle traveling in the adjacent lane or from a driver of the other vehicle, wherein the vehicle is moved from the waiting position to the space if there is the space and the electronic control unit determines that the response is received.

8. The vehicle traveling control device according to claim 7, wherein the electronic control unit is further programmed to determine that the determination that a response is received is valid if at least one of conditions is valid, the conditions including that a length of the space is not decreasing over time at a rate equal to or larger than a predetermined value, that the other vehicle is stationary or is decelerating, that a predetermined signal such as sounds a horn or blinks a light is received from the other vehicle, that a hand signal is received from a driver of the other vehicle, and that the driver's face of the other vehicle is directed toward the vehicle.

* * * * *